United States Patent Office 3,467,614
Patented Sept. 16, 1969

3,467,614
CROSS-LINKABLE COPOLYMER DISPERSIONS
Karl Dinges, Odenthal, and Erwin Mueller, Leverkusen, Germany, assignors to Farbenfabriken Bayer Aktiengesellschaft, Leverkusen, Germany, a corporation of Germany
No Drawing. Filed Feb. 14, 1967, Ser. No. 615,903
Claims priority, application Germany, Mar. 25, 1966, F 48,777
Int. Cl. C08f 1/13; C09d 5/02
U.S. Cl. 260—29.6                 4 Claims

ABSTRACT OF THE DISCLOSURE

Aqueous dispersions of cross-linkable copolymers of olefinically unsaturated monomers and 0.2 to 50% by weight, based on the weight of the copolymer, of an acrylic or methacrylic acid amide or ester which contains a terminal halomethyl carbonyl group, said copolymers being cross-linkable in the presence of hydroxyl groups as components of the copolymer or as separately added compounds, at a pH above 7.

---

The present invention relates to aqueous dispersions of cross-linkable copolymers and to a process for their production.

Acryl- and/or methacrylic acid amides or esters which contain a terminal halogenmethyl-carbonyl group in the ester or in the amide group are copolymerized in aqueous emulsion at pH-values in the range from 2 to 6 with at least one further monomer to form cross-linkable copolymer dispersions. The terminal halogenmethylcarbonyl groups react with hydroxy groups which may be contained in the copolymer or added to the dispersion as hydroxyl groups containing organic compound at pH-values higher than 7 to form cross-linked products.

It is known that polymers can be prepared by an emulsion polymerisation process comprising polymerising acrylic or methacrylic amides in which the amide groups are substituted by reactive groups such as methylol-, methylolalkylether-, tert.- aminomethylene- or methylolester groups, with other copolymerisable monomers. Copolymers with film-forming properties are obtained, in which the aforementioned monomers have been incorporated without splitting up the reactive groups.

The reactive groups of polymers such as these can be split up under the action of heat and/or acid catalysts, in which case the polymers are converted into crosslinked insoluble products.

These polymers satisfy practical requirements in many fields of application. There are, however, several instances where crosslinking at elevated temperature or at acid pH-values is difficult and, in some cases, totally impossible to carry out. In cases such as these, crosslinking in the alkaline range at low temperatures is highly desirable. Unfortunately, there are hardly any cross-linkable compounds which are suited to this purpose.

An object of this invention is a process for the preparation of crosslinkable copolymer dispersions from olefinically unsaturated monomers, part of which may contain hydroxyl groups, in aqueous emulsion at pH-values in the range from 2 to 6 in the presence of copolymerization catalysts, in which at least one monomeric acrylic and/or methacrylic acid derivative with a terminal halogenmethyl-carbonyl group is also used as comonomer.

Acrylic or methacrylic acid derivatives with terminal halogen-methyl-carbonyl group, are of particular interest such as those represented by the general Formula I:

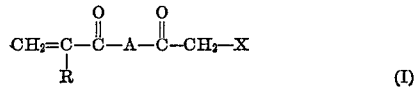

(I)

in which R=H, CH₃

$A = -NH-CH_2-NH-$
$\phantom{A} = -NH-CO-NH-$
$\phantom{A} = -O-CH_2-CH-O-C-NH-$
$\phantom{AAAAAAAAAAAA}|\phantom{AAA}\|$
$\phantom{AAAAAAAAAAAA}CH_3\phantom{AA}O$
$\phantom{A} = -O-CH_2-CH-O-$
$\phantom{AAAAAAAAAAAA}|$
$\phantom{AAAAAAAAAAAA}CH_3$ X = Cl, Br The following monomers of Formula I are mentioned by way of example:

1. $\phantom{AA}CH_3$
   $\phantom{AA}|$
   $CH_2=C-CO-NH-CH_2-NH-CO-CH_2Cl$    M.p. 143°C 2. $CH_2=CH-CO-NH-CH_2-NH-CO-CH_2Cl$    M.p. 183°C 3. $CH_2=CH-CO-NH-CH_2-NH-CO-CH_2Br$    M.p. 176°C 4. $\phantom{AA}CH_3$
   $\phantom{AA}|$
   $CH_2=C-CO-NH-CO-NH-CO-CH_2Cl$    N.p. 138°C 5. $\phantom{AA}CH_3$
   $\phantom{AA}|$
   $CH_2=C-COO-CH_2-CH-OOCNH-CO-CH_2Cl$
   $\phantom{AAAAAAAAAAAAAAA}|$
   $\phantom{AAAAAAAAAAAAAAA}CH_3$    M.p. 59-61°C 6. $\phantom{AA}CH_3$
   $\phantom{AA}|$
   $CH_2=C-COO-CH_2-CH-OOC-CH_2Cl$
   $\phantom{AAAAAAAAAAAAA}|$
   $\phantom{AAAAAAAAAAAAA}CH_3$    B.p. 0.1.90-97°C The monomers of methacrylic and/or acrylic acid derivatives with terminal chloromethyl-carbonyl groups in which the methyl group can be substituted by lower alkyl radicals with 1 to 4 carbon atoms, are used in quantities of approximately 0.2 to 50% by weight, preferably in quantities of 0.5 to 20% by weight, in the copolymerization reaction.

The monomers are prepared by a known process (cf. German patent application F 47,698).

The following olefinically unsaturated monomers are examples of suitable copolymerization components. They are used in amounts of 99,8–50% by weight, preferably 99,5–80% by weight:

(a) α,β-olefinically unsaturated monocarboxylic acids and their derivatives such as acrylic and methacrylic acid amides, acrylo- and methacrylonitrile, esters of acrylic acid and methacrylic acid, particularly those with saturated, monohydric aliphatic containing 1 to 20 carbon atoms or cycloaliphatic alcohols containing 5–7 carbon atoms, such as esters of the aforementioned acids with methyl-, ethyl-, propyl-, isopropyl-, isobutyl-, hexyl-, octyl-, and stearyl alcohol and cyclohexanol, methylcyclohexanol, and with benzyl alcohol, phenol, cresol and furfuryl alcohol; monoesters of α,β-monoolefinically unsaturated monocarboxylic acids with 3 to 4 carbon atoms, with dihydric saturated aliphatic alcohols containing 2 to 4 carbon atoms, such as per example 2-hydroxyethyl methacrylate, 2-hydroxypropylmethacrylate, 4-hydroxybutylmethacrylate, 2-hydroxyethylacrylate, 2-hydroxypropylacrylate and 4-hydroxybutylacrylate.

(b) Aromatic monovinyl compounds such as styrene, α-methyl styrene, vinyl toluene, p-chlorostyrene or other nuclear-substituted vinyl benzenes.

(c) Esters of vinyl alcohol with carboxylic acids or with hydrohalic acids, vinyl ethers, vinyl ketones such as vinyl chloride, vinylidene chloride, vinyl acetate, vinyl propionate, vinylethylether and vinylisobutylether.

(d) Conjugated diolefines with 4 to 6 carbon atoms such as butadiene, isoprene, 2,3-dimethylbutadiene and chloroprene.

(e) N-methylolethers of acrylic and methacrylic amide corresponding to the general Formula II:

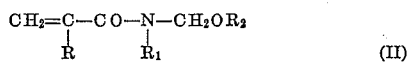

(II)

in which R represents hydrogen or methyl, $R_1$ represents hydrogen, alkyl, aralkyl or aryl, $R_2$ represents alkyl or cycloalkyl such as, for example, methyl, ethyl, n-propyl, isopropyl, n-butyl, isobutyl and cyclohexyl (cf. German Auslegeschrift No. 1,035,363).

(f) Mannich bases of acrylic and methacrylic acid amide corresponding to the general Formula III:

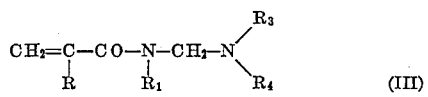

(III)

in which R and $R_1$ are as defined in Formula II, whilst $R_3$ and $R_4$ represent alkyl, cycloalkyl or, together, represent a heterocyclic radical such as the morpholine radical. Suitable compounds of this type are mentioned in German Auslegeschrift No. 1,102,404.

In addition, other mono-olefinically unsaturated monomers may be used as copolymerisation components such as maleic acid, fumaric acid or crotonic acid esters, styrene sulphonic acid, unsaturated aliphatic or cycloaliphatic hydrocarbons. In addition, crosslinking monomers with several unconjugated olefinically unsaturated groups, may be used in quantities of approximately 0.01 to 5, preferably 0.01 to 3% by weight, based on the weight of the monomers as a whole, such as glycol diacrylate, glycol dimethacrylate, acrylic acid and/or methacrylic acid allyl ester, divinyl benzene, triacryloylperhydro-s-tri-azine, triallyl cyanurate or substitution products of these compounds.

It is possible to prepare copolymers both from two and from a larger number of monomers belonging to various classes of compounds. The selection of these monomers will be based on the properties required in the copolymers.

The carboxyl-containing monomers such as acrylic and methacrylic acid, are usually incorporated into the copolymers in relatively small quantities unless it is intended to produce copolymers with strongly hydrophilic properties. To prepare copolymers obtained by polymerising the monomers in aqueous emulsion, the aforementioned olefinically unsaturated acids are preferably used in quantities of between 0.1 and 10% by weight, based on the weight of the monomers as a whole. The amides of the aforementioned acids are also preferably used in the quantities specified.

Hydroxyalkyl esters or acrylic and/or methacrylic acid are preferably used in quantities of 0.2 and 20% by weight, based on the weight of the monomers as a whole.

Acrylonitrile or methacrylonitrile is used in quantities of up to 30% by weight, based on the total weight of the monomers.

The monomers corresponding to general Formulae II and III are preferably used in quantities of 0.1 to 15% by weight, based on the total weight of the monomers.

The aforementioned monomers are copolymerised in aqueous emulsion in the presence of emulsifiers, as known per se, for which purpose both cation-active and anion active and even non-ionic emulsifiers may be used. Combination of these emulsifiers may also be used.

Examples of suitable anionic emulsifiers are higher fatty acids, resinic acids, acid fatty alcohol sulphuric acid sulphonated castor oil, higher hydroxyalkyl sulphonates, esters, higher alkyl sulphonates and alkylaryl sulphonates, sulpho-succinic acid esters, salts of fatty acid condensation products with hydroxyalkyl carboxylic acids, aminoalkyl carboxylic acids and the water-soluble salts of sulphonated ethylene oxide adducts.

Examples of cationic emulsifiers are salts of alkylamines, aryl-, alkylaryl-, or resin amines and inorganic acids, as well as salts of quaternary ammonium compounds.

Suitable non-ionic emulsifiers are the reaction products, known per se, of ethylene oxide with long-chain fatty alcohols such as cetyl alcohol, lauryl alcohol, oleyl alcohol, and octadecyl alcohol, or of phenols such as octyl and dodecyl phenols. Reaction products of more than 10 mols, preferably 15 to 30 mols, of ethylene oxide with 1 mol of fatty alcohol or phenol are particularly suitable.

The emulsifiers referred to above may be used in a total quantity of between 0.5 and 20%, based on the total weight of the monomers. They are preferably used in quantities of between 2 and 10%.

To prepare graft polymers, the monomers may be polymerised or copolymerised as known per se in the presence of polymers or copolymers of conjugated diolefins such as butadiene, or other already preformed polymers containing olefinic double bonds.

Although polymerisation is preferably carried out at temperatures in the range from 10 to 70° C., temperatures of up to about 80° C. may also be used.

The pH-value at which the copolymers are prepared can vary within wide limits, but is preferably in the range from pH 2 to 6 and, more particularly, in the range from pH 2 to 4.

Compounds which regulate molecular weight such as long-chain alkyl mercaptans, diisopropyl xanthogenate and others, may also be used during polymerisation.

Suitable polymerisation catalysts are inorganic per compounds such as potassium or ammonium persulphate, hydrogen peroxide, percarbonates, organic peroxide compounds such as acyl peroxides, for example benzoyl peroxide, alkyl hydroperoxides such as tert.-butyl hydroperoxide, cumene hydroperoxide, p-methane hydroperoxide, dialkyl peroxides such as di-tert.-butyl peroxide. The inorganic or organic per compounds are advantageously used in combination with reducing agents are for example sodium pyrosulphite or bisulphite.

The catalysts are used in the quantities normally employed for this type of polymerisation, i.e. in quantities of between 0.01 and 5%, based on the total weight of the monomers used.

The crosslinkable aqueous copolymer dispersions prepared in accordance with the invention contain reactive chloro-methyl carbonyl groups which can be crosslinked in the presence of compounds containing alcoholic hydroxyl groups, at pH values of higher than 7, preferably at pH-values in the range from 8 to 10. This is all the more surprising insofar as copolymers such as these cannot be crosslinked on their own at pH-values of higher than 7, unless hydroxyl groups are present in the polymer molecule.

The organic compounds containing alcoholic hydroxyl groups may be of low or relatively high molecular weight. The hydroxyl groups may even be present in the copolymers prepared in accordance with the invention in which copolymerisation is carried out with monomers containing hydroxyl groups.

To prepare crosslinked products, the dispersions obtained in accordance with the invention need only be applied in thin layers to polymers containing hydroxyl groups, providing no hydroxyl-containing monmers had been used during copolymerisation, and crosslinked at pH values of higher than 7.

The crosslinkable copolymer dispersions obtained in accordance with the invention are suitable for the production of lacquer films.

It is known from U.S. patent specification No. 3,134,-810 that compounds corresponding to the following formula can be prepared and copolymerized with other copolymerisable monomers.

$$CH_2=CH-\underset{\underset{O}{\|}}{C}-NH-CH_2-NH-\underset{\underset{O}{\|}}{C}-CH_2-CH_2-X$$

X=halogen

It would be expected that copolymers containing polymerised units of the aforementioned monomers could be crosslinked with organic compounds containing at least two hydroxyl groups, at pH-values of higher than 7. This however is not the case, as will be shown further on in Comparison Test C. By contrast, it must be regarded as surprising that the copolymers prepared in accordance with the invention can be converted so easily at pH-values higher than 7, into crosslinked products with valuable technological properties by hydroxyl-containing compounds or polymers, the hydroxyl groups even being incorporated into the copolymer itself.

The aqueous dispersions according to the invention are suitable to produce films and coatings.

Insofar as they have not already disclosed in German patent application F 47,698, the monomers of Formula I used as starting materials for the polymerisation process claimed may be prepared as described below:

(1) Compound: $CH_2=\underset{\underset{CH_3}{|}}{C}-CO-NH-CH_2-NH-CO-CH_2Cl$ 2964 g. of N-methylolacetamide (24 mols), 2040 g. of methacrylamide (24 mols) and 2 g. of phenthiazine are dissolved in 4.8 litres of glacial acetic acid, 48 cc. of conc. hydrochloric acid being added to the resulting solution. The solution is left standing overnight and room temperature, evaporated in vacuo to dryness and the residue recrystallised from methanol.

M.P., 143° C. Yield: 3.46 kg.=75% of theory.

(2) Compound:

$$CH_2=CH-CO-NH-CH_2-NH-CO-CH_2Cl$$

A mixture of 370.5 g. of N-methylolchloroacetamide (3 mols), 213 g. of acrylamide (3 mols), 600 cc. of glacial acetic acid 6 cc. of conc. hydrochloric acid and 0.5 g. of phenthiazine, is worked up as described in (1). The product is recrystallised from water.

M.P., 183° C. Yield: 348 g.=66% of theory.

(3) Compound: $CH_2=\underset{\underset{CH_3}{|}}{C}-COO-CH_2-\underset{\underset{CH_3}{|}}{CH}-OOC-CH_2Cl$ A mixture of 144 g. of methacryl-β-hydroxypropylester (1 mol) 94.5 g. of chloroacetic acid (1 mol), 200 cc. of toluene, 2 g. of p-toluene sulphonic acid, 0.5 g. of 2,6-ditert.-butylphenol - 4 - methylolmethylether, is azeotropically esterified, 17 cc. of water being eliminated (calc. 18 g.). The toluene is then evaporated off in vacuo and the residue distilled in a high vacuum.

B.P. 0.1: 90–97° C. Yield: 200 g.=91% of theory.

(4) Compound: $CH_2-\underset{\underset{CH_3}{|}}{C}-CO-NH-CO-NH-CO-CH_2Cl$ 119.5 g. of chloromethylacylisocyanate (1 mol) are added dropwise to a solution of 85 g. of methacrylamide (1 mol) in 200 cc. of dry toluene. There is a rise in temperature to 50–60° C. The product is heated for 30 minutes to 90° C. and suction-filtered after cooling. Recrystallisation from ethyl acetate.

M.P., 138° C. Yield: 118 g.

(5) Compound: $CH_2=\underset{\underset{CH_3}{|}}{C}-COO-CH_2-\underset{\underset{CH_3}{|}}{CH}-OOCNH-CO-CH_2Cl$ 119.5 g. of chloromethylacylisocyanate (1 mol) are added dropwise to a solution of 114 g. of β-hydroxypropylmethacrylate (1 mol) in 300 cc. of dry toluene. There is a rise in temperature to 40–50° C. The solvent is distilled off in vacuo. The residue melts at 59–61° C. Yield: 159 g.

The compositions of the compounds described in (1 to 5) and their molecular weight were checked and confirmed by elementary analysis and molecular weight measurement.

EXAMPLES

Examples 1 and 2 together with Comparison Examples A, B and C are carried out in accordance with the following procedure:

550 g. of desalted water are introduced into a two-litre glass vessel equipped with stirring mechanism, reflux condenser, gas inlet pipe and thermometer. 20.0 g. of an emulsifier obtained by reacting 20 mols of ethylene oxide with 1 mol of nonyl phenol, are dissolved in the desalted water. 2.0 g. of an alkyl sulphonate containing 12 to 14 carbon atoms, and 2.0 g. of a condensation product of naphthalene sulphonic acid and formaldehyde are also dissolved in the aqueous phase. The vessel is then flushed with nitrogen for a period of at least 10 minutes and heated to 55° C.

A total of 400 g. of the monomer specified later, is mixed and emulsified in the aqueous phase. 20% by weight of this emulsion are introduced into the polymerisation vessel and activated with a solution of 0.24 g. of potassium persulphate and 0.32 g. of sodium pyrosulphite, each in 5 g. of water. The remaining 80% by weight of the emulsion are run in uniformly over a period of three hours during the polymerisation reaction. Solutions of 0.96 g. of potassium persulphate in 20 g. of water, and 1.28 g. of sodium pyrosulphite in 20 g. of water, are simultaneously run in. Polymerisation is largely complete after three to four hours. The resulting 37–39% dispersions are stirred for another four hours.

The emulsions prepared had a pH-value of 2 to 3. To check the alkaline crosslinking, the pH values were adjusted to 10.0 with dilute NaOH.

Crosslinking is checked by assessing the solubility of thin films of the polymers in question in trichloroethylene. An evaluation scale of 1 to 5 is used, 1 signifying complete solubility and 5 complete insolubility. In addition, films of the polymers are measured for their tensile strength, breaking elongation and moduli at 20% and 300% elongation. All the measurements are taken on the polymer films prepared at room temperature both directly after they have been dried (24 hours at room temperature) and following an after-treatment lasting 5 minutes at 130° C.

EXAMPLE 1

Monomers used: 85% by weight of ethyl acrylate, 10% by weight of β-hydropropylmethacrylate, 5% by weight of the compound $$H_2C=C-CONH-CH_2-NH\ CO-CH_2-Cl$$
$$\underset{CH_3}{|}$$

Test results:

| | Drying | |
|---|---|---|
| | 24 hours at room temperature | 24 hours at room temperature and 5 mins. at 130° C. |
| Solubility in trichloroethylene | 4–5 | 5 |
| Tensile strength (kg./cm.²) | 29 | 42 |
| Breaking elongation (percent) | 460 | 380 |
| Modulus at 20% elongation (kg./cm.²) | 2.5 | 2.6 |
| Modulus at 300% elongation (kg./cm.²) | 11.0 | 25.1 |

It is apparent than an extremely effective crosslinking is obtained by the alkaline treatment of the polymers according to the invention in the presence of free hydroxyl groups.

If the tests described are repeated with the difference that the polymer dispersion is adjusted to pH 2.5 before drying, no crosslinking takes place as shown by the following test data:

|  | Drying | |
| --- | --- | --- |
|  | 24 hours at room temperature | 24 hours at room temperature and 5 mins. at 130° C |
| Solubility in trichloroethylene | 0 | 1 |
| Breaking elongation (in percent) | >2,000 | >2,000 |
| Modulus at 20% elongation (kg./cm.²) | 1.7 | 1.7 |
| Modulus at 300% elongation (kg./cm.²) | 2.9 | 3.0 |

The same result is obtained when the polymer dispersion is adjusted to pH 5.5 before a film is formed.

Comparison Test A

Monomers used: 85% by weight of ethyl acrylate and 15% by weight of β-hydroxypropylmethacrylate.

The solubility of the film prepared from the alkaline emulsion (pH 10) was found to be 1 both before and after the after-treatment. Its tensile strengths were found to be 2.0 kg./cm.² and 1.7 kg./cm.², its elongation at break in excess of 2000% in both cases, whilst its moduli were 1.0 kg./cm.² (20% elongation) and 1.7 kg./cm.² (300% elongation).

These data show quite clearly that no crosslinking was obtained with a polymer of 95% by weight of ethyl-acrylate and 5% by weight of β-hydroxypropylmethacrylate.

Comparison Test B

Monomers used: 95% by weight of ethyl acrylate and 5% by weight of the compound

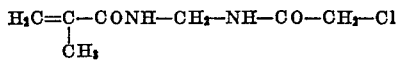

Testing of the alkaline polymer films produced the following result:

|  | Drying | |
| --- | --- | --- |
|  | 24 hours at room temperature | 24 hours at room temperature and 5 mins. at 130° C. |
| Solubility in trichloroethylene | 2-3 | 3-4 |
| Tensile strength (kg./cm.²) | 4.1 | 5.6 |
| Breaking elongation (percent) | >2,000 | >2,000 |
| Modulus at 300% elongation (kg./cm.²) | 3.1 | 3.4 |

In this case, too, crosslinking only takes place to a limited extent, as shown in particular by the high elongation.

Comparison Test C (to U.S. patent specification 3,134,810)

If, in Example 1, the compound

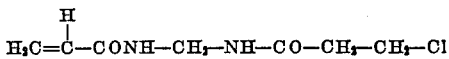

is used in place of the compound according to the invention

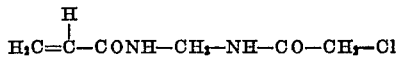

and if, in other respects, the procedure of Example 1 is adopted, no crosslinks are obtained under exactly the same conditions. Test results:

|  | Drying | |
| --- | --- | --- |
|  | 24 hours at room temperature | 24 hours at room temperature and 5 mins. at 130° C. |
| Solubility in trichloroethylene | 1 | 1 |
| Tensile strength (kg./cm.²) | 2.0 | 1.7 |
| Breaking elongation, percent | >2,000 | >2,000 |

EXAMPLE 2

In this example, the hydroxyl groups required for crosslinking are obtained by mixing a dispersion of a polymer containing free hydroxyl groups with a dispersion of a polymer containing reactive halogen groups.

Polymer dispersion A, prepared from 95% by weight of ethyl acrylate, 5% by weight of the compound

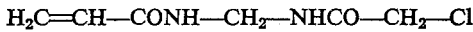

Polymer dispersion B, prepared from 90% by weight of ethyl acrylate and 10% by weight of β-hydroxypropylmethacrylate (mixture ratio of the polymer dispersions A:B=50:50).

Test results:

|  | Drying | |
| --- | --- | --- |
|  | 24 hours at room temperature | 24 hours at room temperature and 5 mins. at 130° C. |
| Solubility in trichloroethylene | 3 | 5 |
| Tensile strength (kg./cm.²) | 15 | 15 |
| Breaking elongation (percent) | 880 | 700 |

In other words, excellent crosslinking is obtained in this case, too.

If, in polymer A, the compound identified by its formula is replaced by the following compound

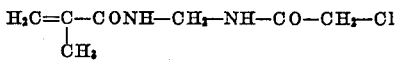

almost the same results are obtained.

EXAMPLE 3

Following the procedure of Example 1, a polymer is prepared from 60% by weight of butyl acrylate, 20% by weight of styrene, 10% by weight of acrylonitrile, 5% by weight of β-hydroxyethylmethacrylate and 5% by weight of the compound

After the alkaline-crosslinked polymer films had been similarly tested, they were found to be insoluble in trichloroethylene (scale=5) and to have a breaking elongation of 560%.

If, on the other hand, the pH of the polymer dispersion was adjusted to acid before drying (pH 2.5) no crosslinking occurs: solubility in trichloroethylene=1, breaking elongation=>2000%.

EXAMPLE 4

Following the procedure of Example 1, a polymer is prepared from 80.0% by weight of ethyl acrylate, 9.4% by weight of 2-ethylhexylmethacrylate, 4.4% by weight of β-hydroxypropylmethacrylate and 6.2% by weight of the compound

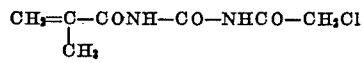

Testing of the alkaline dispersion (pH=10) in accordance with Example 1 gave the following results:

|  | Drying | |
| --- | --- | --- |
|  | 24 hours at room temperature | 24 hours at room temperature and 5 mins. at 130° C. |
| Solubility in trichloroethylene | 4 | 4 |
| Tensile strength (kg./cm.²) | 12 | 12 |
| Breaking elongation (percent) | 835 | 725 |
| Modulus at 20% elongation (kg./cm.²) | 1.3 | 1.3 |
| Modulus at 300% elongation (kg./cm.²) | 5.0 | 5.5 |

EXAMPLE 5

Following the procedure of Example 1, a polymer is prepared from 56% by weight of butyl acrylate, 34% by weight of vinyl toluene, 2.5% by weight of methacrylamide and 7.5% by weight of the compound:

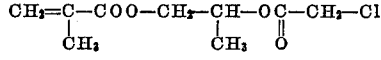

After the alkaline latex (pH=10) has been dried at room temperature, and the resulting polymer film heated for 5 minutes at 130° C., a fully crosslinkable, flexible film is obtained which is completely insoluble in trichloroethylene.

EXAMPLE 6

300 g. of salt-free water, 6 g of an alkyl sulphonate containing 12 to 16 carbon atoms and 1.0 g. of a condensation product of naphthalene sulphonic acid and formaldehyde, as well as 100 g. of the compound.

$$CH_2=C-COO-CH_2-CH-O-O-CH_2-Cl$$
$$\quad\quad |\quad\quad\quad\quad\quad\quad |\quad\quad ||$$
$$\quad\quad CH_3\quad\quad\quad\quad\quad CH_3\quad O$$

and 100 g. of n-butylacrylate, are introduced into a 1-litre vessel equipped with stirring mechanism, thermometer, reflux condenser and gas inlet pipe.

The mixture is heated with stirring to 45° C. whilst the air is displaced from the vessel with nitrogen, and then activated with 0.6 g. of potassium persulphate and 0.8 g. of sodium pyrosulphite. A stable latex with a solids content of 40% is obtained after 4½ hours, pH-value=2.8.

The polymer film obtained from the alkaline latex was still completely soluble after 24 hours' drying at room temperature, and reheating to 130° C.

If, by contrast, the latex of Example 6 is mixed with a latex corresponding to Comparison Test A (mixture ratio 30:70) and the resulting mixture adjusted to pH 10, the resulting polymer film is completely insoluble after drying at room temperature.

EXAMPLE 7

Monomers used: 78.0% by weight of ethylacrylate, 6.5% by weight of β-hydroxypropylmethacrylate, 2.5% by weight of acrylamide, 5.0% by weight of methacrylamide-methylolmethyl ether and 8.0% by weight of the compound:

$$H_2C=C-COO-CH_2-CH-OC-NH-CO-CH_2-Cl$$
$$\quad\quad |\quad\quad\quad\quad\quad\quad |$$
$$\quad\quad CH_3\quad\quad\quad\quad\quad CH_3$$

Polymerisation is carried out in accordance with the procedure described in respect of Example 1. In this case, the pH-value is kept between 3.5 and 5.5 by the addition of dilute sodium hydroxide.

The resulting polymer is both acid- and alkaline-crosslinkable.

Polymer films obtained at pH 2.5–10.0 by drying the latex, followed by 5 minutes' heating to 130° C., were completely insoluble in trichloroethylene and methylethylketone.

EXAMPLE 8

300 g. of an alkyl sulphonate containing 12–16 carbon atoms, 120 g. of an ethoxylation product of lauryl alcohol and 20 mols of ethylene oxide, 48 g. of a condensation product of naphthalene sulphonic acid and formaldehyde, 12 g. of sodium pyrophosphate, 360 g. of the compound $$H_2C=CH-CO-NH-CH_2-NH-CO-CH_2-Cl$$

as well as 480 g. of methacrylic acid are dissolved in 9600 g. of desalted water in a 40 l. VA-autoclave with stirring. The solution is cooled to 10° C. and 30 g. of tertiary dodecyl mercaptan, dissolved in 4080 g. of acrylonitrile, are then added. After closing the vessel 6950 g. of butadiene are introduced under pressure.

The emulsion is tempered at 18–20° C. and activated with (1) a solution of 0.075 g. of ferrous sulphate and 9.8 g. of sodium formaldehyde sulphoxylate in 60 g. of desalted water, which has been adjusted to pH 4 with dilute sulphuric acid;

(2) a solution of 9.8 g. of tertiary butyl hydroperoxide in 60 g. of acrylonitrile.

Polymerisation starts after 2–3 hours.

The following additives are introduced in the course of the reaction:

At a conversion rate of 4%: 24 g. of sodium pyrophosphate in 750 g. of water;

At a conversion rate of 12%: 30 g. of tertiary dodecyl mercaptane dissolved in 60 g. of acrylonitrile.

At a conversion rate of 60%: 60 g. of an alkyl sulphonate containing 12–16 carbon atoms, 48 g. of a condensation product of naphthalene sulphonic acid and formaldehyde as well as 120 g. of an ethoxylation product of lauryl alcohol and 20 mols of ethylene oxide, dissolved in 750 g. of water.

After the latex has reached a concentration of 47–48% by weight (conversion rate 94–96%) the polymerisation is stopped by the addition of a solution of 120 g. of sodium dithionite, 6 g. of the sodium salt of ethylene-diamine-N,N′-tetra acetic acid as well as 24 g. of an ethoxylation product of lauryl alcohol and 20 mols of ethylene oxide in 900 g. of water.

After the addition of an antioxidant the excess monomers are removed from the polymerisation emulsion by distillation in vacuum at 40° C. A stable latex having a polymer content of 48–49 percent by weight is obtained.

According to the recipe of Example 8, stable latices having a polymer content of 48–49 percent by weight can be produced from the following monomers:

(a)

| | Percent by weight |
|---|---|
| Butadiene | 58 |
| Acrylonitrile | 35 |
| Methacrylic acid | 2 |
| Compound of the formula $H_2C=CH-CO-NH-CH_2-NH-CO-CH_2-Cl$ | 3 |

(b)

| | |
|---|---|
| Butadiene | 56 |
| Acrylonitrile | 35 |
| Compound of the formula $H_2C=CH-CO-NH-CH_2-NH-CO-CH_2-Cl$ | 3 |
| β-hydroxypropyl methacrylate | 2 |
| Methacrylic acid | 4 |

(c)

| | |
|---|---|
| Butadiene | 58 |
| Acrylonitrile | 35 |
| Compound of the formula $H_2C=CH-CO-NH-CH_2-NH-CO-CH_2-Cl$ | 3 |
| Compound of the formula $H_2C=C-CO-NH-CH_2-NH-CO-CH_2-Cl$ | 2 |
| Methacrylic acid | 2 |

We claim:

1. A cross-linkable aqueous copolymer dispersion of an olefinically unsaturated monomer and from 0.22 to 50% by weight, based on the weight of the copolymer, of a monomer of the formula:

$$CH_2=C-\overset{O}{\overset{||}{C}}-A-\overset{O}{\overset{||}{C}}-CH_2-X$$
$$\quad\quad |$$
$$\quad\quad R$$

wherein R is H or $CH_3$; A is $NH-CH_2-NH-$, $NH-$, $CO-NH-$, $$-O-CH_2-CH-O-C-NH-\text{ or }-O-CH_2-C-O-$$
$$\quad\quad\quad\quad |\quad\quad ||\quad\quad\quad\quad\quad\quad\quad\quad |$$
$$\quad\quad\quad\quad CH_3\quad O\quad\quad\quad\quad\quad\quad\quad\quad CH_3$$

and X is Cl or Br

2. The cross-linkagle aqueous copolymer dispersion of claim 1 where said olefinically unsaturated monomer is acrylic acid; methacrylic acid; acrylic acid amide; methacrylic acid amide; acrylonitrile; methacrylonitrile; esters of arylic acid and methacrylic acid with alkanols containing 1 to 20 carbon atoms, cyclohexanol, methylcyclohexanol, benzyl alcohol and furfuryl alcohol; monoesters of α, β-monoolefinically unsaturated monocarboxylic acids of 3 to 4 carbon atoms with dihydric saturated aliphatic alcohols containing 2 to 4 carbon atoms; styrene; α-methylstyrene; vinyl toluene; p-chlorostyrene; vinyl chloride; vinylidene chloride; vinyl acetate; vinyl propionate; vinylethylether; vinylisobutylether; conjugated diolefins containing 4 to 6 carbon atoms; compounds of the formula:

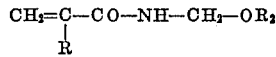

where R is hydrogen or methyl and $R_2$ is alkyl of from 1 to 4 carbon atoms or cyclohexyl or mixtures thereof.

3. The cross-linkable aqueous copolymer dispersion of claim 1 wherein said olefinically unsaturated monomer includes an hydroxyalkyl ester of acrylic ar methacrylic acid wherein said alkyl moiety contains from 2 to 4 carbon atoms, the amount of said ester, based on the total monomer weight of said copolymer, being 0.2 to 20% by weight.

4. The cross-linkable aqueous copolymer dispersion of claim 1 including therein an organic compound containing alcoholic hydroxyl groups.

References Cited

UNITED STATES PATENTS

| | | |
|---|---|---|
| 3,134,810 | 5/1964 | Tomcufcik et al. __ 260—85.7 X |
| 3,206,425 | 9/1965 | Müller et al. _____ 260—29.6 |

MURRAY TILLMAN, Primary Examiner

H. ROBERTS, Assistant Examiner

U.S. Cl. X. R.

260—77.5, 80.3, 86.1

UNITED STATES PATENT OFFICE
CERTIFICATE OF CORRECTION

Patent No. 3,467,614 September 16, 1969

Karl Dinges et al.

It is certified that error appears in the above identified patent and that said Letters Patent are hereby corrected as shown below:

Column 10, line 54, "0.22" should read -- 0.2 --; lines 61 to 66 should read -- wherein R is H or $CH_3$; A is $-NH-CH_2-NH-$ $-NH-CO-NH-$, $O-CH_2-\underset{\underset{CH_3}{|}}{CH}-O-\underset{\underset{O}{\|}}{C}-NH-$ or $-O-CH_2-\underset{\underset{CH_3}{|}}{CH}-O-$ and X is Cl or Br. --.

Signed and sealed this 5th day of May 1970.

(SEAL)
Attest:

Edward M. Fletcher, Jr.
Attesting Officer

WILLIAM E. SCHUYLER, JR.
Commissioner of Patents